United States Patent
Getto et al.

(10) Patent No.: US 11,765,559 B2
(45) Date of Patent: Sep. 19, 2023

(54) PASSIVE RADIO FREQUENCY COMPONENTS WITH VOLTAGE STANDING WAVE RATIO MONITORS

(71) Applicant: MICROLAB/FXR LLC, Parsippany, NJ (US)

(72) Inventors: Luke Getto, Chester, NJ (US); Alejandro Pieroni, New Brunswick, NJ (US); Phil Chen, Denville, NJ (US); Andre Prazeres, Oxford, NJ (US)

(73) Assignee: MICROLAB/FXR LLC, Parsippany, NJ (US)

( * ) Notice: Subject to any disclaimer, the term of this patent is extended or adjusted under 35 U.S.C. 154(b) by 682 days.

(21) Appl. No.: 16/110,112

(22) Filed: Aug. 23, 2018

(65) Prior Publication Data

US 2019/0068301 A1    Feb. 28, 2019

Related U.S. Application Data

(60) Provisional application No. 62/551,712, filed on Aug. 29, 2017.

(51) Int. Cl.
*H04W 4/38* (2018.01)
*H04B 17/309* (2015.01)
(Continued)

(52) U.S. Cl.
CPC .............. *H04W 4/38* (2018.02); *H02J 50/001* (2020.01); *H04B 17/103* (2015.01);
(Continued)

(58) Field of Classification Search
CPC ......... H04W 4/38; H04W 4/90; H02J 50/001; H02J 50/20; H02J 7/345; H04B 17/103; H04B 17/309; H04L 67/12
See application file for complete search history.

(56) References Cited

U.S. PATENT DOCUMENTS

| 2006/0145884 A1* | 7/2006 | Graham | ............. H01Q 3/267 340/687 |
| 2007/0045040 A1* | 3/2007 | Harwood | ............. H04R 5/02 181/199 |

(Continued)

OTHER PUBLICATIONS

TheDarkSide, "How to build a fully managed and scalablelong-range network with low-power nodes," Technical article dated Jul. 25, 2016, posted in Texas Instruments E2E support forums: https://e2e.ti.com/blogs_/b/process/posts/how-to-build-a-fully-managed-and-scalable-long-range-network-with-low-power-nodes (6 pages).

*Primary Examiner* — Mandish K Randhawa
(74) *Attorney, Agent, or Firm* — McCarter & English, LLP

(57) ABSTRACT

Systems and methods for monitoring passive components of a passive public safety distributed antenna system are provided, including a bi-directional amplifier, a public safety monitor coupled to and in communication with the bi-directional amplifier, and at least one smart node coupled to and in communication with the public safety monitor. The at least one smart node includes a processor configured to monitor signal characteristic information of at least one passive component of the system and transmit the signal characteristic information of the at least one passive component to the public safety monitor. The public safety monitor generates system performance information based on a signal at the bi-directional amplifier and the transmitted signal characteristic information of the at least one passive component from the at least one smart node.

24 Claims, 9 Drawing Sheets

(51) Int. Cl.
*H04L 67/12* (2022.01)
*H04B 17/10* (2015.01)
*H02J 50/00* (2016.01)
H02J 7/34 (2006.01)
H02J 50/20 (2016.01)
H04W 4/90 (2018.01)

(52) U.S. Cl.
CPC ........... *H04B 17/309* (2015.01); *H04L 67/12* (2013.01); *H02J 7/345* (2013.01); *H02J 50/20* (2016.02); *H04W 4/90* (2018.02)

(56) References Cited

U.S. PATENT DOCUMENTS

| | | | |
|---|---|---|---|
| 2007/0243899 A1* | 10/2007 | Hermel | H04W 16/26 455/553.1 |
| 2016/0315706 A1* | 10/2016 | Yeo | H04B 7/022 |
| 2016/0371213 A1* | 12/2016 | Voto | G06F 13/4045 |
| 2017/0214117 A1* | 7/2017 | Gracyk | G01S 13/767 |
| 2017/0244326 A1* | 8/2017 | Petrovic | H02M 3/33507 |
| 2019/0349426 A1* | 11/2019 | Smith | H04L 45/20 |
| 2020/0119585 A1* | 4/2020 | Rodrigues Mansano | G01R 27/2605 |

\* cited by examiner

PASSIVE RADIO FREQUENCY COMPONENTS WITH VOLTAGE STANDING WAVE RATIO MONITORS

RELATED APPLICATIONS

This application claims priority to U.S. Provisional Patent Application Ser. No. 62/551,712 filed Aug. 29, 2017, the entire disclosure of which is hereby expressly incorporated by reference.

BACKGROUND

Technical Field

The present disclosure relates generally to the field of distributed antenna systems. More specifically, the present disclosure relates to methods and systems for monitoring passive components and providing radio frequency power harvesting in a passive public safety distributed antenna system (DAS).

Related Art

A passive public safety distributed antenna system (DAS) generally comprises several passive components requiring continuous monitoring to ensure system functionality and to immediately identify a problem with a passive component of the system. A DAS can include numerous antennas, couplers, splitters, and tappers wherein the failure or breakdown of one of these passive components (e.g., an antenna), can cause the DAS to fall out of compliance or be inoperable.

A conventional DAS monitors the performance of a passive component by inserting an additional component such as a monitoring sensor between the coupler, splitter, and/or tapper and the antenna. A monitoring sensor is generally an active component requiring an independent power source and an additional cable to couple the monitoring sensor to a bi-directional amplifier (BDA) positioned at the head end of the DAS. The BDA generally processes information captured by the monitoring sensor to determine the performance of the passive component. For example, the performance of the passive component can be determined by measuring characteristics of the signals received and transmitted from the BDA positioned at the head end of the DAS.

A conventional DAS is disadvantageous because it requires the use of an additional component (e.g., a monitoring sensor) inserted in between the coupler, splitter and/or tapper and the antenna, thereby necessitating an additional power source and an additional cable to couple the additional component to the BDA to transmit component performance information to the BDA. As such, the additional component increases the cost of the DAS. Moreover, the insertion of the additional component can lead to signal loss. Further, public safety requirements generally do not allow for passive components of the passive public safety DAS to be powered by a power source separate from a main power source, which is typically located at the head end of the DAS (e.g., a BDA), but to the extent there are additional power sources, the public safety requirements generally mandate each power source to have a backup which, when scaled across each antenna of the DAS, becomes cost prohibitive.

The conventional DAS is also disadvantageous because it only monitors the signals via the BDA positioned at the head end of the DAS. Generally, such a system configuration does not provide information about each passive component (e.g., an antenna) in the DAS, which can be critical because the failure or breakdown of one of the passive components can cause the DAS to fall out of compliance or to be inoperable. Further, while the BDA can measure the return loss of a signal, in a large DAS, a failure at an end point of the system can be below an alarm threshold, and thus, the failure of a passive component can be undetected.

In view of the foregoing, there is currently significant interest in the distributed antenna system field in developing a system that can monitor a passive component without requiring an additional component necessitating an additional power source and an additional coupling connection, wherein the system is operable within the public safety DAS infrastructure. As such, it would be highly beneficial to develop a system capable of monitoring a coupler, a splitter, a tapper and an antenna in the DAS in order to determine the performance thereof, without an additional monitoring sensor requiring an independent power source (e.g., alternating current (AC) or direct current (DC) power source) and an additional cable to couple to the BDA. Preferably, such a system is operable within the 100 MHz to 1 GHz frequency range of a passive public safety DAS. Accordingly, the system of the present disclosure addresses these and other needs.

SUMMARY

The present disclosure relates to methods and systems for monitoring passive components in a passive public safety distributed antenna system (DAS). The system includes at least one smart node powered by one of energy harvested (collected) from radio frequency (RF) signals, a bias tee, and a battery. The at least one smart node monitors signal characteristic information of an antenna of the DAS and transmits the signal characteristic information of the antenna to a public safety monitor (PSM). The PSM can generate a DAS system performance report based on a monitored downlink signal at a bi-directional amplifier (BDA) of the DAS, and the signal characteristic information can be transmitted from the smart node. The PSM can transmit the report to a user of the DAS through a modem.

BRIEF DESCRIPTION OF THE DRAWINGS

The foregoing features of the present disclosure will be apparent from the following Detailed Description of the Invention, taken in connection with accompanying drawings, in which.

DETAILED DESCRIPTION

The present disclosure relates to methods and systems for providing passive components and energy harvesting in a distributed antenna system (DAS), and in particular a passive public safety DAS, as described in detail below in connection with FIGS. 1-9.

The methods and systems of the present disclosure implement Industrial Internet of Things (IIoT) technology in a passive component (e.g., a coupler, a tapper or a splitter) of the DAS to monitor the performance of another passive component (e.g., an antenna) without requiring an additional component necessitating an additional coupling connection. Such integration does not necessitate an additional power source because IIoT enables the passive component to absorb energy from and thereby operate from RF signals. Further, IIoT can operate within the 100 MHz to 1 GHz frequency range of a passive public safety DAS, but of course, other frequencies are possible.

Figure 1:
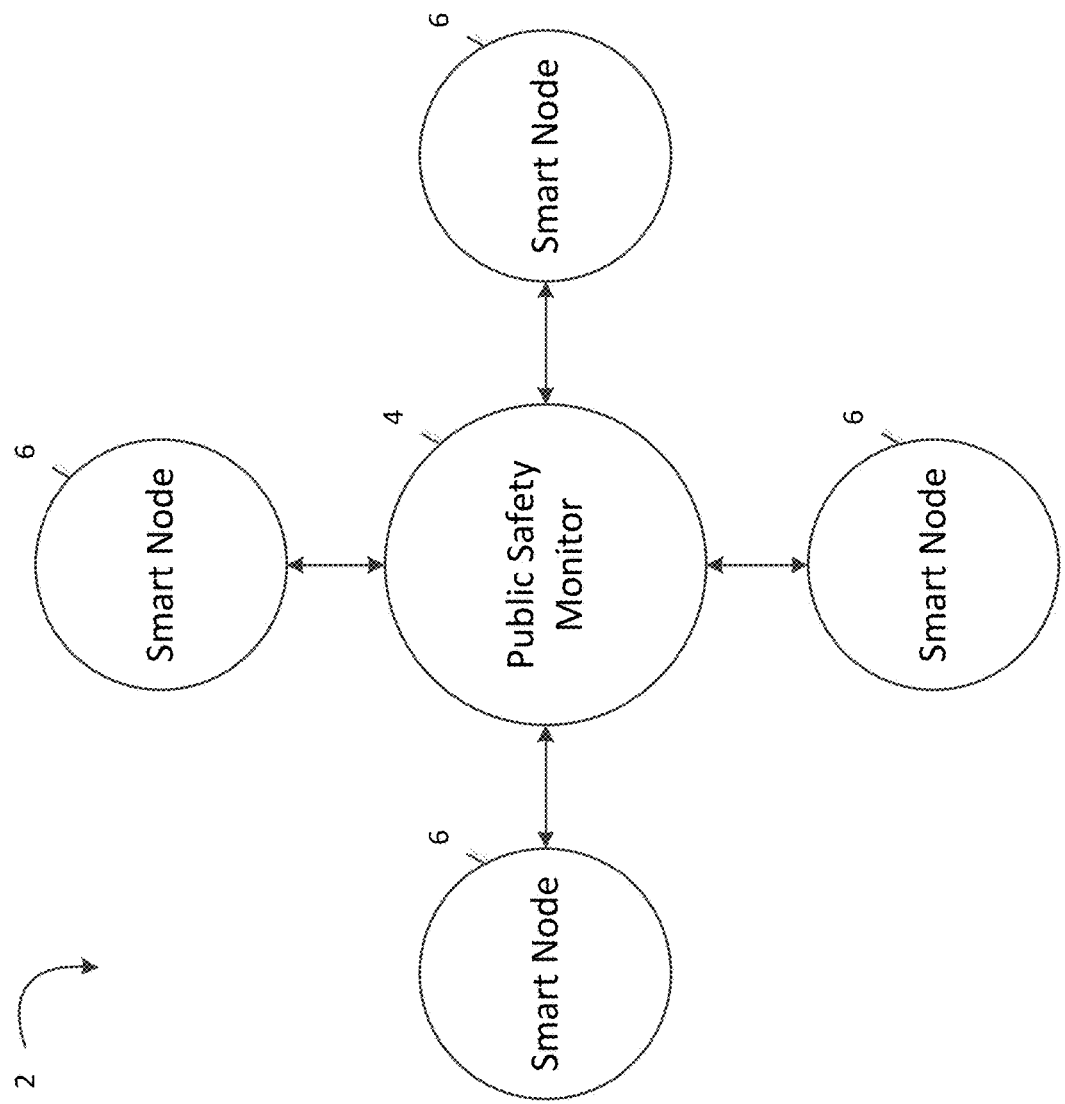
FIG. 1 is a diagram illustrating a monitoring network in accordance with the present disclosure.

Turning to the drawings, FIG. 1 is a diagram illustrating a monitoring network 2 in accordance with the present disclosure. IEEE 802.15.4 is a technical standard which specifies the operation of a low-rate wireless personal area network (LR-WPAN). An IEEE 802.15.4 network can structured as a peer-to-peer network or a star network. In the star network configuration, the monitoring network 2 can include a public safety monitor (PSM) 4 and one or more smart nodes 6. The PSM 4 is the central node and a full-function device (FFD). As the central node, the PSM 4 coordinates the monitoring network and can communicate with the one or more smart nodes 6. The smart nodes 6 can only communicate with the PSM 4 and are reduced-function devices (RFDs). The IEEE 802.15.4 standard provides lower network layers of a WPAN but can be adapted to other networks such as a wired public safety monitoring network. Internet of Things (IoT) low-power communication protocols can be implemented in the public safety monitoring network, including but not limited to, Bluetooth™ Low Energy (BLE), Long Term Evolution for Machine-Type Communications (LTE-MTC), Narrowband Internet of Things (NB-IoT), and Long Range Wide Area Network (LoRaWAN).

Figure 2:
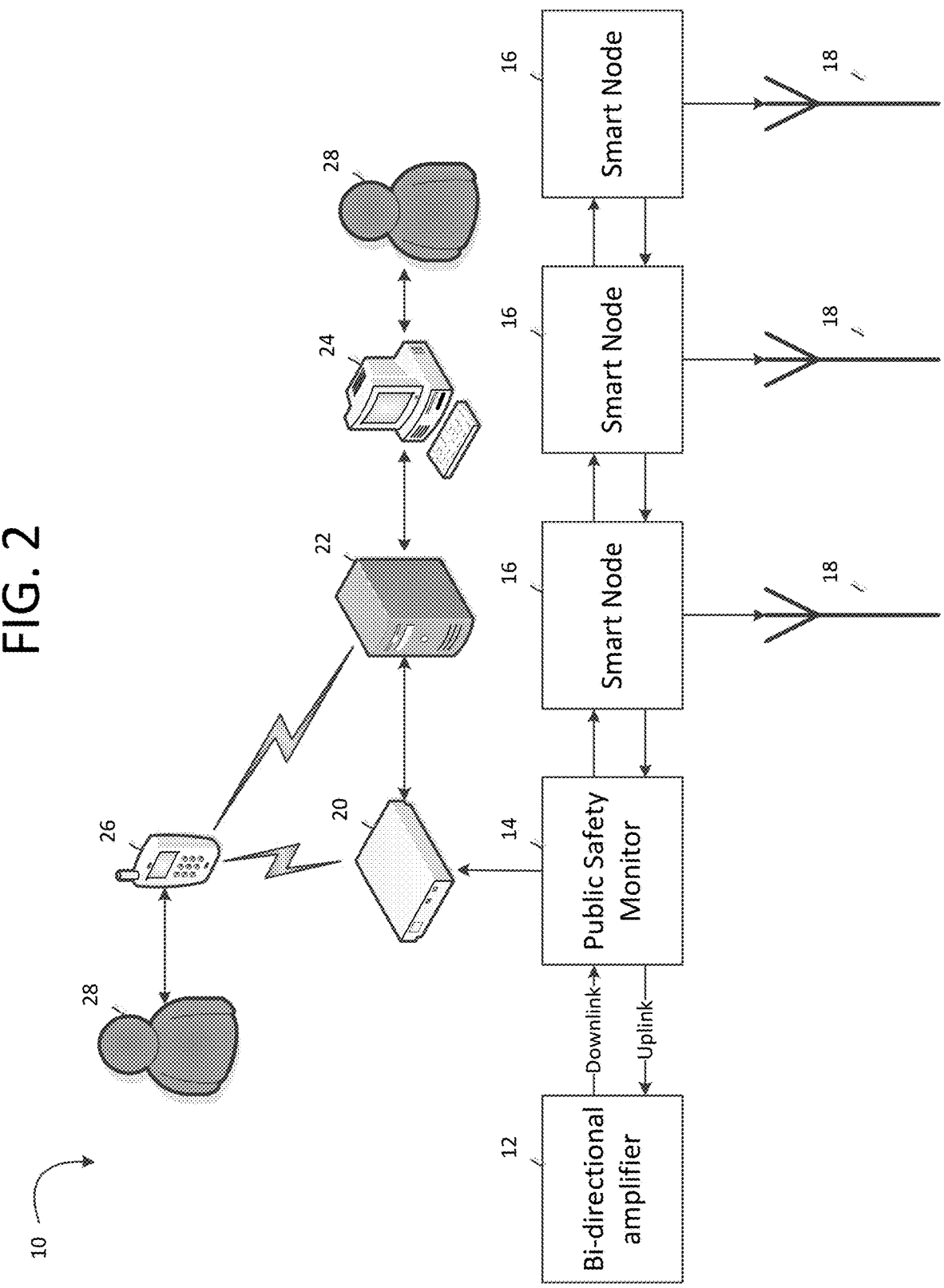
FIG. 2 is a diagram illustrating a passive public safety distributed antenna system (DAS) in accordance with the present disclosure.

FIG. 2 is a diagram illustrating a passive public safety DAS 10 in accordance with the present disclosure. The DAS 10 can include a bi-directional amplifier (BDA) 12, a public safety monitor (PSM) 14, one or more smart nodes 16, one or more antennae 18, a modem 20, a server 22, a computer system 24 having a user interface, and a mobile terminal/device 26. Each smart node 16 can be coupled to a respective antenna 18, and can monitor signal characteristic information of the respective antenna 18. Each smart node 16 can also be coupled to the PSM 14 and can transmit the monitored signal characteristic information of the each respective antenna 18 to the PSM 14. Each smart node 16 can also be coupled to the other smart nodes for receiving and transmitting the monitored signal characteristic information of the respective antennae 18 to the PSM 14. In an embodiment of the system 10, the smart nodes 16 are coupled to each other and/or the PSM 14 by a coaxial cable (not shown), but of course, other connection types are possible (e.g., optical connections, wireless, etc.)

The PSM 14 can monitor the downlink signal at the BDA 12 and can aggregate the signal characteristic information transmitted by each smart node 16. The PSM 14 can generate a DAS system performance report based on the monitored downlink signal at the BDA 12 and the signal characteristic information transmitted by each of the smart nodes 16. The PSM 14 can transmit the report to a user 28 of the DAS through the modem 20. The modem can be a fourth generation (4G) network technology modem. For example, the PSM 14 can transmit the report, via the modem 20, to the server 22 which the user 28 can view from a user interface screen displayed on the computer system 24, such as a webpage or graphic user interface displayed on a desktop computer.

Additionally, the PSM 14 can generate and transmit alerts to the user 28 based on the signal characteristic information transmitted by each smart node 16. For example, the PSM 14 can generate and transmit an alert when particular signal characteristic information such as the voltage signal wave ratio (VSWR) reaches a predetermined threshold. Alerts can be transmitted directly to the mobile terminal 26 of the user 28. The mobile terminal can be, but is not limited to, a cellular phone, a personal digital assistant (PDA), a tablet, etc. For example, the modem 20 can transmit an alert to the server 22 which can relay the alert to the mobile terminal 26 via a network connection. The modem 20 can also transmit the alert directly to the mobile terminal 26 via a network connection. The network work connection can be wired or wireless and can include, but is not limited to, an Internet connection, cellular network, local area network, wide area network, etc.

Additionally, the PSM 14 can notify the user 28 of the performance of one or more of the antennae 18 or of the entire system 10 (or components thereof). The performance of an antenna 18 can be based on the forward and reverse power at each input port. For example, the VSWR can be indicative of the performance of an antenna 18. As such, the user 28 can identify a problem or failure at a specific antenna 18, if desired.

In another embodiment, the smart node 16 can implement an active component to enable the monitoring of signal characteristic information such as voltage standing wave ratio (VSWR). The active component can be powered by an energy harvesting component. For example, the radio frequency (RF) energy of received antenna signals can be harvested and used to power the active component of the smart node 16. Accordingly, in a DAS, the smart node 16 can provide active monitoring of signal characteristic information and reporting of the signal characteristic information. Additionally, Internet of Things (IoT) and Industrial Internet of Things (IIoT) technology implemented in the passive components of the smart node 16 can be used to monitor the signal characteristic information of an antenna 18 without requiring an external power source.

Figure 3:
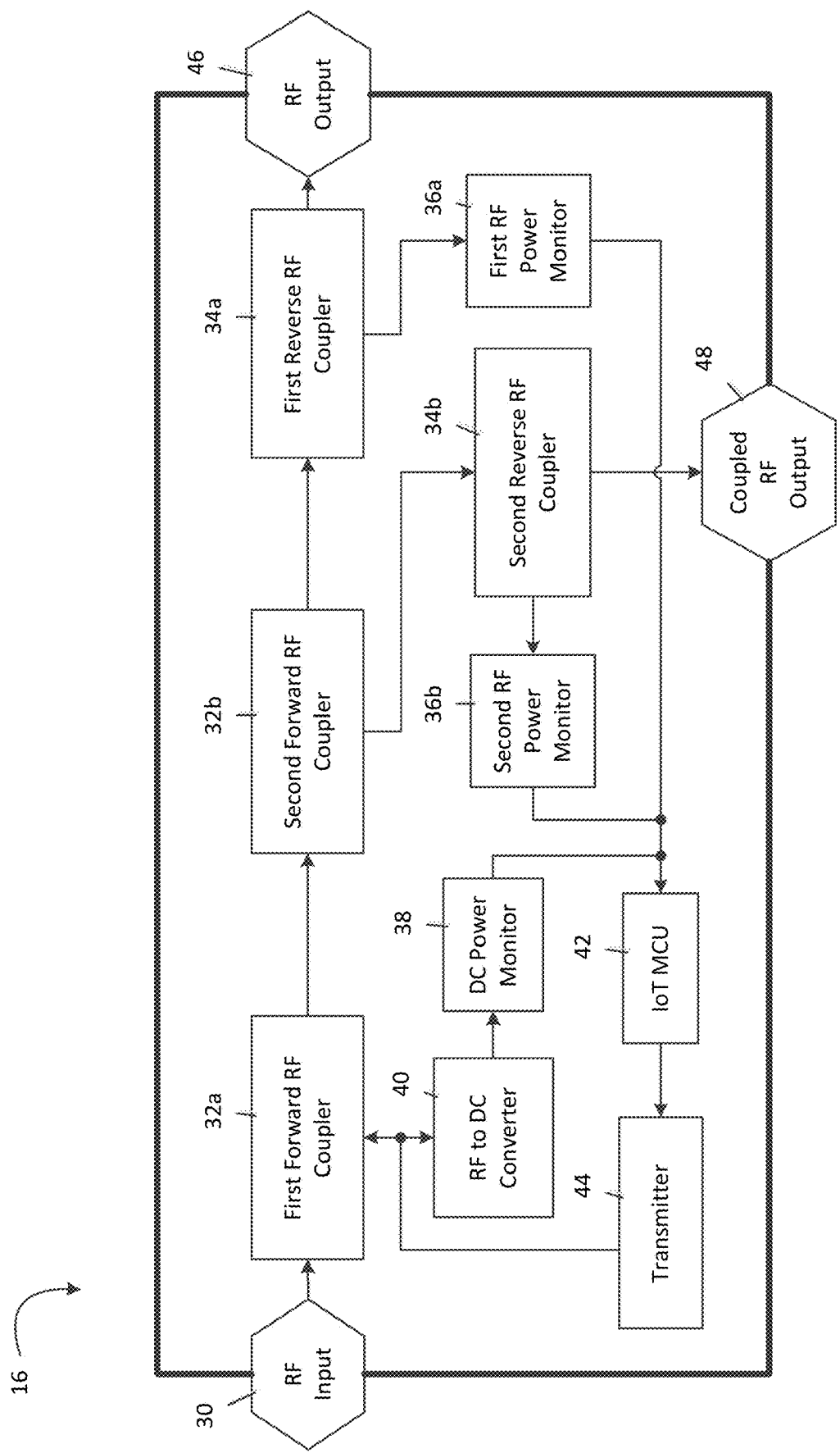
FIG. 3 is a diagram illustrating hardware and software components capable of being utilized to implement the systems and methods of the present disclosure.

FIG. 3 is a diagram illustrating hardware and software components capable of being utilized to implement an embodiment of the systems/methods of the present disclosure. The smart node 16 can operate in the 100 MHz to 1 GHz frequency range, such that the system can comply with public safety DAS equipment (which generally operates in the 100 MHz to 1 GHz range). The frequency range can vary depending on the type of network or application of the DAS. As shown in FIG. 3, the smart node 16 can include a radiofrequency (RF) input port 30, a first forward RF coupler 32a, a second forward RF coupler 32b, a first reverse RF coupler 34a, a second reverse RF coupler 34b, a first RF power monitor 36a, a second RF power monitor 36b, a direct current (DC) power monitor 38, an RF to DC converter 40, an IoT microcontroller (MCU) 42, a transmitter 44, an RF output port 46 and a coupled RF output 48.

The RF input port 30 can be coupled to the first forward RF coupler 32a. The RF input port 30 receives an antenna signal which is transmitted to the first forward RF coupler 32a. The first forward RF coupler 32a can be coupled to the second forward RF coupler 32b and to the RF to DC converter 40 for harvesting energy from RF signals. The RF to DC converter 40 collects (harvests) RF energy and outputs DC power for the active components within the smart node 16. Additionally, in another embodiment of the invention, the RF to DC converter 40 can store energy in an energy storage device 72 (see FIG. 4, discussed below), such as a battery or a capacitor. The RF to DC converter 40 can comprise circuitry for capturing over-the-air (OTA) signals, while the RF signals it harvests are transmitted via a coaxial cable. Accordingly, the RF to DC converter 40 is used unconventionally by harvesting RF energy from RF signals transmitted via a coaxial cable, instead of OTA signals. The RF to DC converter 40 can be coupled to a DC power monitor 38. The DC power monitor 38 monitors the DC power of a signal after the signal is transmitted through the RF to DC converter 40.

The second forward RF coupler 32b can be coupled to a first reverse RF coupler 34a and to a second reverse RF coupler 34b. The first reverse RF coupler 34a can be coupled to the RF output port 46 and to the first RF power monitor 36a. The second reverse RF coupler can be coupled to the second RF power monitor 36b and to the coupled RF output port 48. The first RF power monitor 36a reflects power via the first reverse RF coupler 34a and the second RF power monitor 36b reflects power via the second reverse RF coupler 34b. Additionally, in an embodiment of the invention, a second forward RF coupler 62b can be coupled to a forward power measurement module 68 rather than the second reverse RF coupler 34b wherein an RF transceiver 76 is coupled to a coupled RF output port 80.

The IoT MCU 42 can be coupled to the DC power monitor 38, the first RF power monitor 36a, and the second RF power monitor 36b. The IoT MCU 42 processes the forward and reflected power measured by these power monitors 36a, 36b, and 38 and generates signal characteristic information regarding the antenna signal to the transmitter 44. The transmitter 44 transmits the signal characteristic information to the RF input port 30 in the reverse direction of the incoming RF signal to the modem 20, where it can be communicated further to the user 28 via the modem 20.

Figure 4:
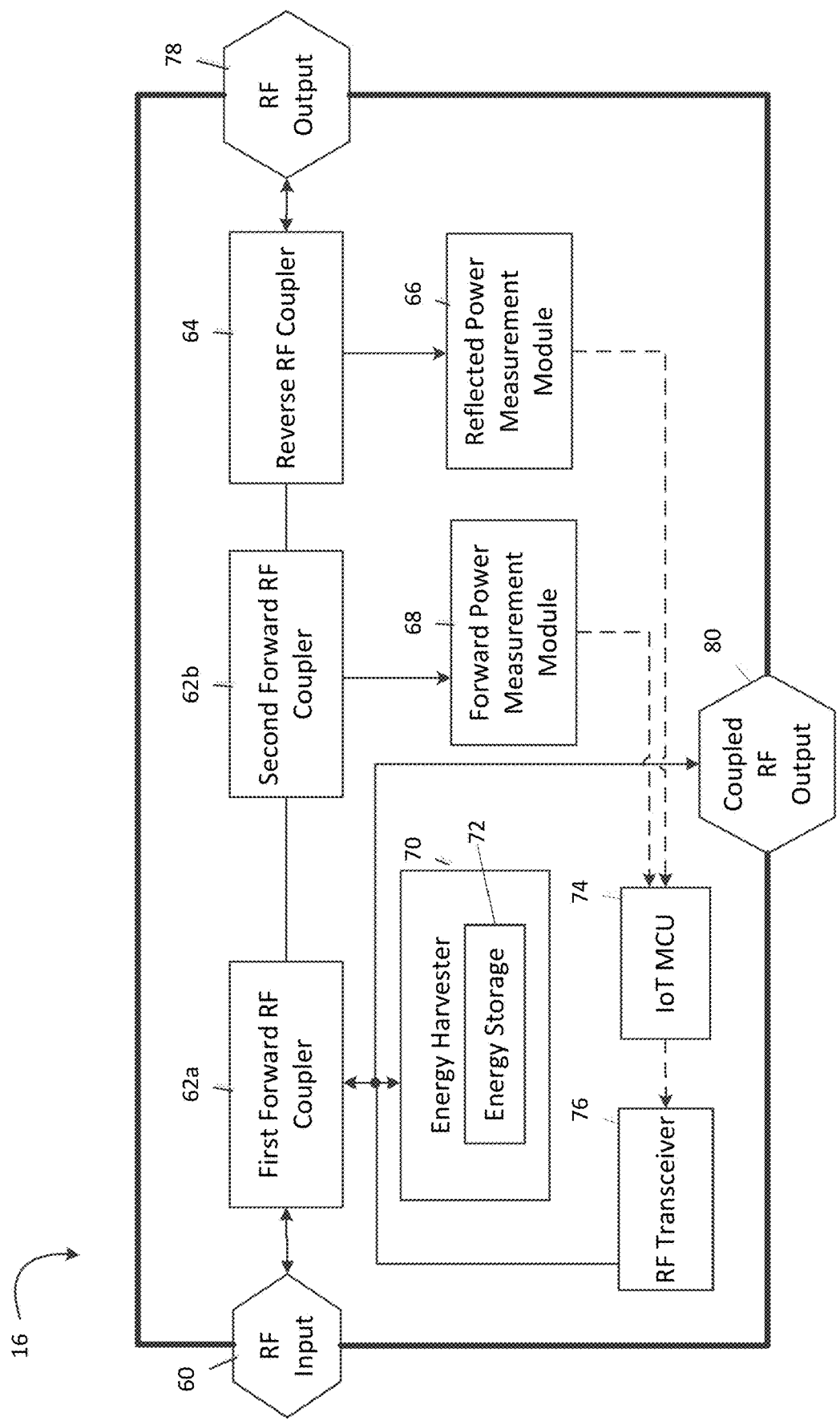
FIG. 4 is a diagram illustrating hardware and software components capable of being utilized to implement another embodiment of the systems and methods of the present disclosure.

As shown in FIG. 4, in another embodiment of the systems/methods of the present disclosure, the smart node 16 can include an RF input port 60, a first forward RF coupler 62a, a second forward RF coupler 62b, a reverse RF coupler 64, a reflected power measurement module 66, a forward power measurement module 68, an energy harvester 70 including an energy storage 72, an IoT MCU 74, an RF transceiver 76, an RF output port 78 and a coupled RF output port 80. The dotted lines denote monitor signals and control signals. The RF input port 60 can be coupled to the first forward RF coupler 62a. The RF input port 60 can receive a signal from the PSM 14 and the smart node 16 can transmit monitor signals to the PSM 14 via the RF input port 60. Alternatively, the RF input port 60 can receive a signal from another smart node 16. The first forward RF coupler 62a can be coupled to the second forward RF coupler 62b and to the energy harvester 70 for harvesting RF energy. The energy harvester 70 harvests RF energy for the active components within the smart node 16. Additionally, the energy harvester 70 can store energy in an energy storage device 72, such as a battery or a capacitor.

The second forward RF coupler 62b can be coupled to a reverse RF coupler 64 and to the forward power measurement module 68. The reverse RF coupler 64 can be coupled to the RF output port 78 and to the reflected power measurement module 66. The RF output port 78 can transmit a signal to another smart node 16 or monitor an antenna 18. Each of the forward power measurement module 68 and the reflected power measurement module 66 can transmit monitor signals and control signals to the IoT MCU 74. The IoT MCU 74 processes the forward and reflected power measured respectively by the forward power measurement module 68 and the reflected power measurement module 66 and generates signal characteristic information regarding the antenna signal to the RF transceiver 76. The RF transceiver 76 transmits the signal characteristic information to the RF input port 60 where it can be communicated further to the modem 20 and as such to the user 28.

Figure 5:
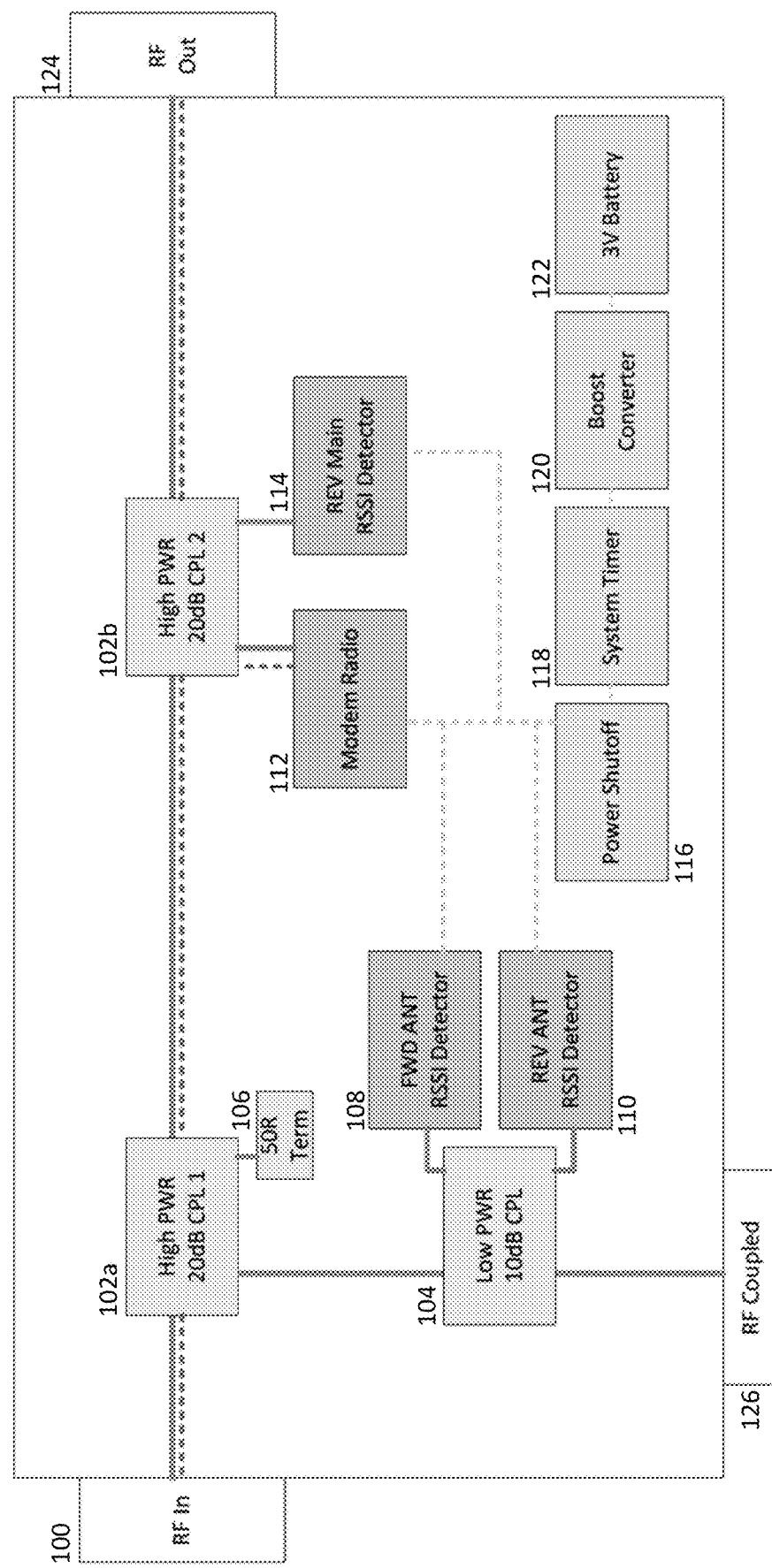
FIG. 5 is a diagram illustrating hardware and software components capable of being utilized to implement another embodiment of the systems and methods of the present disclosure.

As shown in FIG. 5, in another embodiment of the systems/methods of the present disclosure, the smart node 16 can include an RF input port 100; a first high power 20 dB coupler 102a; a second high power 20 dB coupler 102b; a low power 10 dB coupler 104; a 50Ω RF termination 106; a forward antenna receiver signal strength indication (RSSI) detector 108; a reverse antenna RSSI detector 110; a modem radio 112; a reverse main RSSI detector 114; a power shutoff 116; a system timer 118; a boost converter 120; a 3 volt battery 122; an RF coupled output port 126; and an RF output port 124. The dotted lines denote monitor signals and control signals.

The RF input port 100 can be coupled to the first high power 20 dB coupler 102a. The RF input port 100 can receive a signal from the PSM 14 and the smart node 16 can transmit monitor signals to the PSM 14 via the RF input port 100. Alternatively, the RF input port 100 can receive a signal from another smart node 16.

The smart node 16 can be energized by the 3 volt battery 122. The 3 volt battery 122 can be coupled to a boost converter 120 that boosts the voltage to 3.3 volts. The system timer 118 provides for intervals of time wherein the smart node 16 enters different modes. For example, the system timer 118 can provide for an interval of time wherein the smart node 16 can enter an operational mode (i.e., an active mode) and an interval of time wherein the smart node 16 can enter a low current mode (i.e., a sleep mode). The power shutoff 116 receives a control signal from the system timer 118 and based on the received control signal can disconnect power to the elements of the smart node 16.

The forward antenna RSSI detector 108 can be coupled to the low power 10 dB coupler 104. The forward antenna RSSI detector 108 can measure an RF level transmitted forwardly through the RF coupled port 126 (i.e., coupled forward power) and can transmit monitor and control signals indicative of the coupled forward power to the modem radio 112. The reverse antenna RSSI detector 110 can also be coupled to the low power 10 dB coupler 104. The reverse antenna RSSI detector 110 can measure an RF level reflected back from the RF coupled port 126 (i.e., coupled reverse power) and can transmit monitor and control signals indicative of the coupled reverse power to the modem radio 112. The reverse main RSSI detector 114 can be coupled to the second high power 20 dB coupler 102b. The reverse main RSSI detector 114 can measure an RF level reflected back from the RF output port 124 (i.e., main reverse power) and can transmit monitor and control signals indicative of the main reverse power to the modem radio 112.

The modem radio 112 can be coupled to the second high power 20 dB coupler 102b. The modem radio 112 can receive monitor and control signals indicative of (a) the coupled forward power from the forward antenna RSSI detector 108, (b) the coupled reverse power from the reverse antenna RSSI detector 110, and (c) the main reverse power from the reverse main RSSI detector 114 and can transmit, based on the received monitor and control signals, signal characteristic information regarding the antenna signal to the PSM 14 via the coaxial network.

Figure 6:
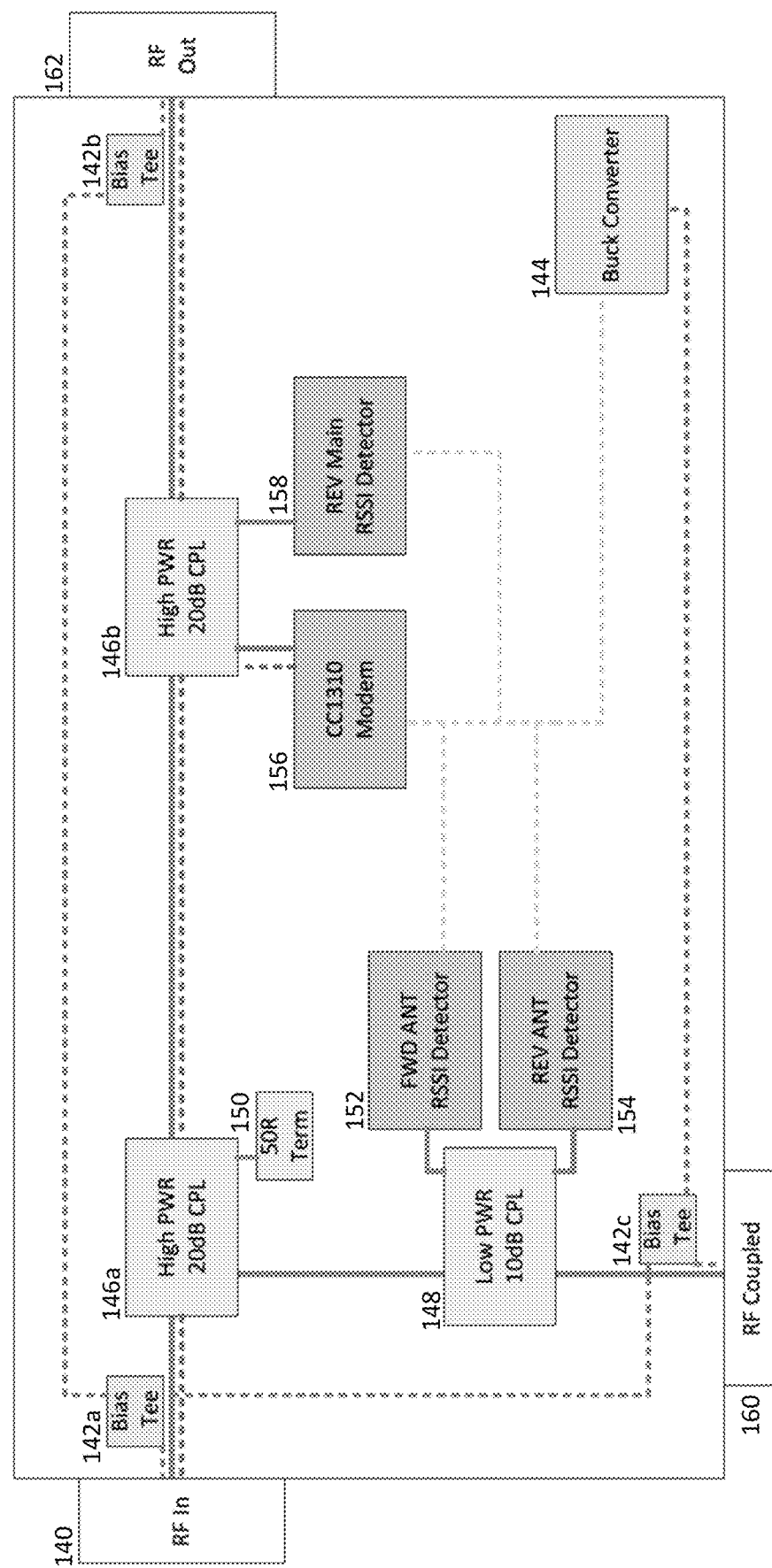
FIG. 6 is a diagram illustrating hardware and software components capable of being utilized to implement another embodiment of the systems and methods of the present disclosure.

As shown in FIG. 6, in another embodiment of the systems/methods of the present disclosure, the smart node 16 can include an RF input port 140; bias tees 142a, 142b and 142c; a buck converter 144; a first high power 20 dB coupler 146a; a second high power 20 dB coupler 146b; a low power 10 dB coupler 148; a 50Ω RF termination 150; a forward antenna RSSI detector 152; a reverse antenna RSSI detector 154; a modem 156; a reverse main RSSI detector 158; an RF coupled output port 160; and an RF output port 162. The dotted lines denote monitor signals and control signals.

The RF input port 140 can be coupled to the first high power 20 dB coupler 146a. The RF input port 140 can receive a signal from the PSM 14 and the smart node 16 can transmit monitor signals to the PSM 14 via the RF input port 140. Alternatively, the RF input port 140 can receive a signal from another smart node 16.

The smart node 16 can be energized from a direct feed RF line via the bias tees 142a, 142b, and 142c and the buck converter 144. The buck converter 144 lowers the voltage to 3.3 volts. The bias tee and buck converter power supply provides for the smart node 16 to enter a continuous operational mode.

The forward antenna RSSI detector 152 can be coupled to the low power 10 dB coupler 148. The forward antenna RSSI detector 152 can measure an RF level transmitted forwardly through the RF coupled port 160 (i.e., coupled forward power) and can transmit monitor and control signals indicative of the coupled forward power to the modem 156 and the buck converter 144. The reverse antenna RSSI detector 154 can also be coupled to the low power 10 dB coupler 148. The reverse antenna RSSI detector 154 can measure an RF level reflected back from the RF coupled port 160 (i.e., coupled reverse power) and can transmit monitor and control signals indicative of the coupled reverse power to the modem 156. The reverse main RSSI detector 158 can be coupled to the second high power 20 dB coupler 146b. The reverse main RSSI detector 158 can measure an RF level reflected back from the RF output port 162 (i.e., main reverse power) and can transmit monitor and control signals indicative of the main reverse power to the modem 156.

The modem 156 can be coupled to the second high power 20 dB coupler 146b. The modem 156 can receive monitor and control signals indicative of (a) the coupled forward power from the forward antenna RSSI detector 152, (b) the coupled reverse power from the reverse antenna RSSI detector 154, and (c) the main reverse power from the reverse main RSSI detector 158 and can transmit, based on the received monitor and control signals, signal characteristic information regarding the antenna signal to the PSM 14 via the coaxial network.

Figure 7:
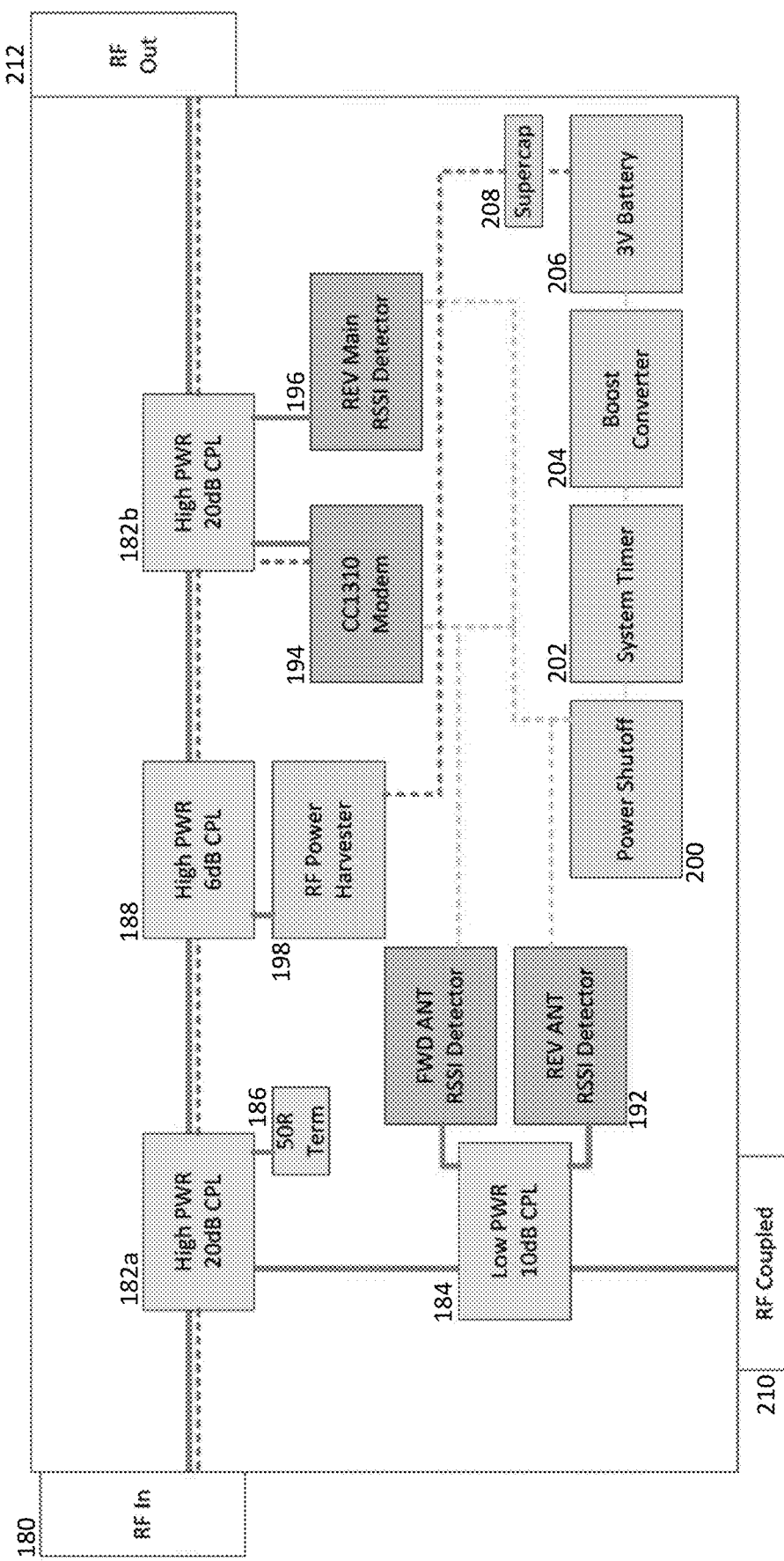
FIG. 7 is a diagram illustrating hardware and software components capable of being utilized to implement another embodiment of the systems and methods of the present disclosure.

As shown in FIG. 7, in another embodiment of the systems/methods of the present disclosure, the smart node 16 can include an RF input port 180; a first high power 20 dB coupler 182a; a second high power 20 dB coupler 182b; a low power 10 dB coupler 184; a 50Ω RF termination 186; a high power 6 dB coupler 188; a forward antenna RSSI detector 190; a reverse antenna RSSI detector 192; a modem 194; a reverse main RSSI detector 196; an RF power harvester 198; a power shutoff 200; a system timer 202; a boost converter 204; a 3 volt battery 206; a supercapacitor 208; an RF coupled output port 210; and an RF output port 212. The dotted lines denote monitor signals and control signals.

The RF input port 180 can be coupled to the first high power 20 dB coupler 182a. The RF input port 180 can receive a signal from the PSM 14 and the smart node 16 can transmit monitor signals to the PSM 14 via the RF input port 180. Alternatively, the RF input port 180 can receive a signal from another smart node 16.

The smart node 16 can be energized by the RF power harvester 198. The RF power harvester 198 is coupled to a direct feed of a primary high power RF line. The RF power harvester 198 charges the supercapacitor 208 wherein the supercapacitor 208 energizes the smart node 16 until the supercapacitor 208 is discharged. In the event the supercapacitor 208 is discharged, the smart node 16 can be energized by the backup 3 volt battery 206. The 3 volt battery 206 can be coupled to a boost converter 204 that boosts the voltage to 3.3 volts. The system timer 202 provides for intervals of time wherein the smart node 16 can enter different modes. For example, the system timer 202 can provide for an interval of time wherein the smart node 16 can enter an operational mode (i.e., an active mode) and an interval of time wherein the smart node 16 can enter a low current mode (i.e., a asleep mode). The power shutoff 200 receives a control signal from the system timer 202 and based on the received control signal can disconnect power to the elements of the smart node 16.

The forward antenna RSSI detector 190 can be coupled to the low power 10 dB coupler 184. The forward antenna RSSI detector 190 can measure an RF level transmitted forwardly through the RF coupled port 210 (i.e., coupled forward power) and can transmit monitor and control signals indicative of the coupled forward power to the modem 194. The reverse antenna RSSI detector 192 can also be coupled to the low power 10 dB coupler 184. The reverse antenna RSSI detector 192 can measure an RF level reflected back from the RF coupled port 210 (i.e., coupled reverse power) and can transmit monitor and control signals indicative of the coupled reverse power to the modem 194. The reverse main RSSI detector 196 can be coupled to the second high power 20 dB coupler 182b. The reverse main RSSI detector 196 can measure an RF level reflected back from the RF output port 212 (i.e., main reverse power) and can transmit monitor and control signals indicative of the main reverse power to the modem 194.

The modem 194 can be coupled to the second high power 20 dB coupler 182b. The modem 194 can receive monitor and control signals indicative of (a) the coupled forward power from the forward antenna RSSI detector 190, (b) the coupled reverse power from the reverse antenna RSSI detector 192, and (c) the main reverse power from the reverse main RSSI detector 196 and can transmit, based on the received monitor and control signals, signal characteristic information regarding the antenna signal to the PSM 14 via the coaxial network.

Figure 8:
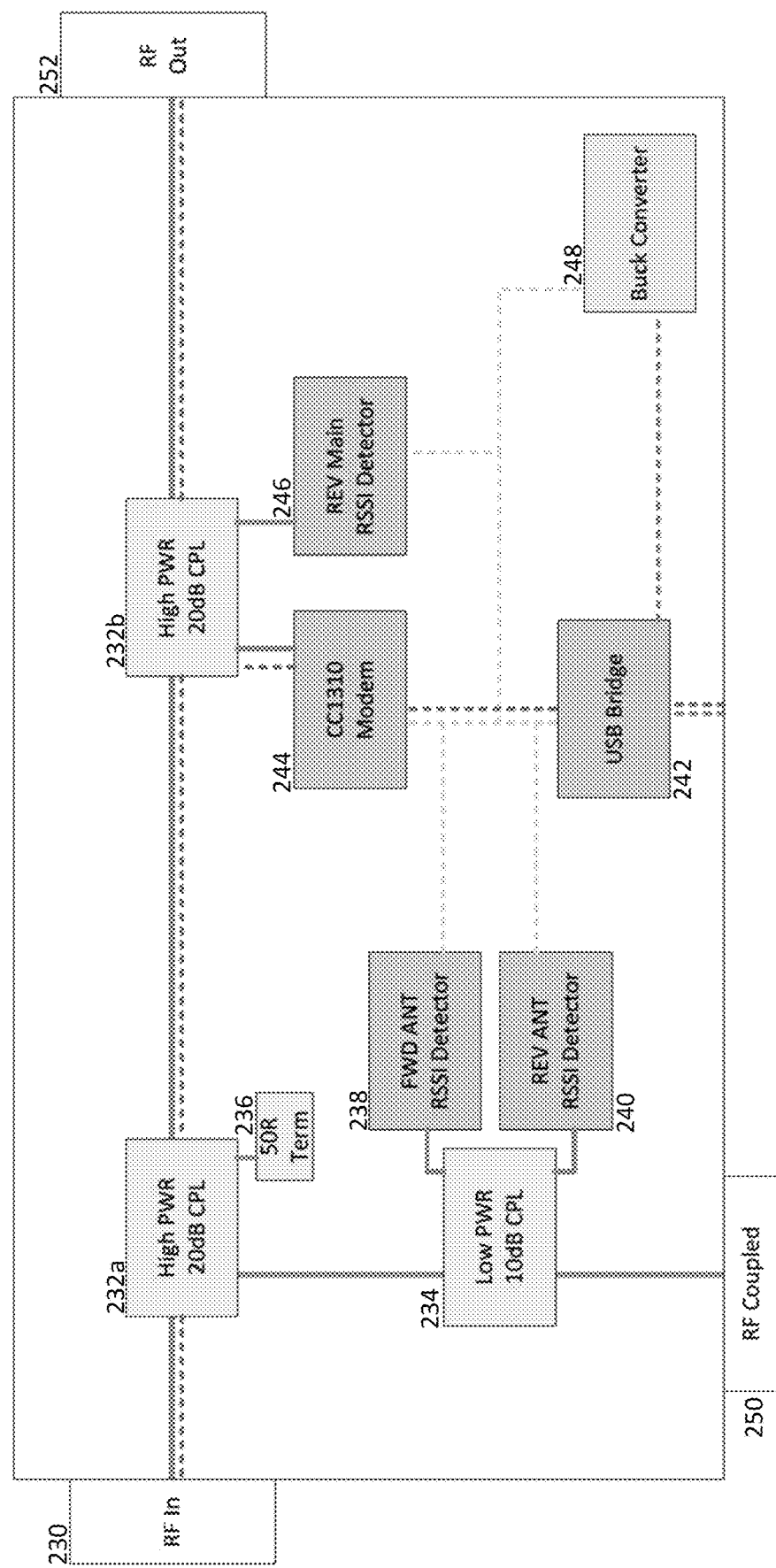
FIG. 8 is a diagram illustrating hardware and software components capable of being utilized to implement another embodiment of the systems and methods of the present disclosure.

As shown in FIG. 8, in another embodiment of the systems/methods of the present disclosure, the smart node 16 can include an RF input port 230; a first high power 20 dB coupler 232a; a second high power 20 dB coupler 232b; a low power 10 dB coupler 234; a 50Ω terminated RF multiplexer 236; a forward antenna RSSI detector 238; a reverse antenna RSSI detector 240; a universal serial bus (USB) bridge 242; a modem 244; a reverse main RSSI detector 246; a buck converter 248; an RF coupled output port 250; and an RF output port 252. The dotted lines denote monitor signals and control signals.

The RF input port 230 can be coupled to the first high power 20 dB coupler 232a. The RF input port 230 can receive a signal from the PSM 14 and the smart node 16 can transmit monitor signals to the PSM 14 via the RF input port 230. Alternatively, the RF input port 230 can receive a signal from another smart node 16. The smart node 16 can be energized by the USB bridge 242. The USB bridge 242 is coupled to a buck converter 248 that lowers the voltage to 3.3 volts. The buck converter power supply provides power for the smart node 16 to enter a continuous operational mode (i.e., an active mode).

The forward antenna RSSI detector 238 can be coupled to the low power 10 dB coupler 234. The forward antenna RSSI detector 238 can measure an RF level transmitted forwardly through the RF coupled port 250 (i.e., coupled forward power) and can transmit monitor and control signals indicative of the coupled forward power to the modem. The reverse antenna RSSI detector 240 can also be coupled to the low power 10 dB coupler 234. The reverse antenna RSSI detector 240 can measure an RF level reflected back from the RF coupled port 250 (i.e., coupled reverse power) and can transmit monitor and control signals indicative of the coupled reverse power to the modem 244. The reverse main RSSI detector 246 can be coupled to the second high power 20 dB coupler 232b. The reverse main RSSI detector 246 can measure an RF level reflected back from the RF output port 252 (i.e., main reverse power) and can transmit monitor and control signals indicative of the main reverse power to the modem 244.

The modem 244 can be coupled to the second high power 20 dB coupler 232b. The modem 244 can receive monitor and control signals indicative of (a) the coupled forward power from the forward antenna RSSI detector 238, (b) the coupled reverse power from the reverse antenna RSSI detector 240, and (c) the main reverse power from the reverse main RSSI detector 246 and can transmit, based on the received monitor and control signals, signal characteristic information regarding the antenna signal to the PSM 14 via the coaxial network.

Figure 9:
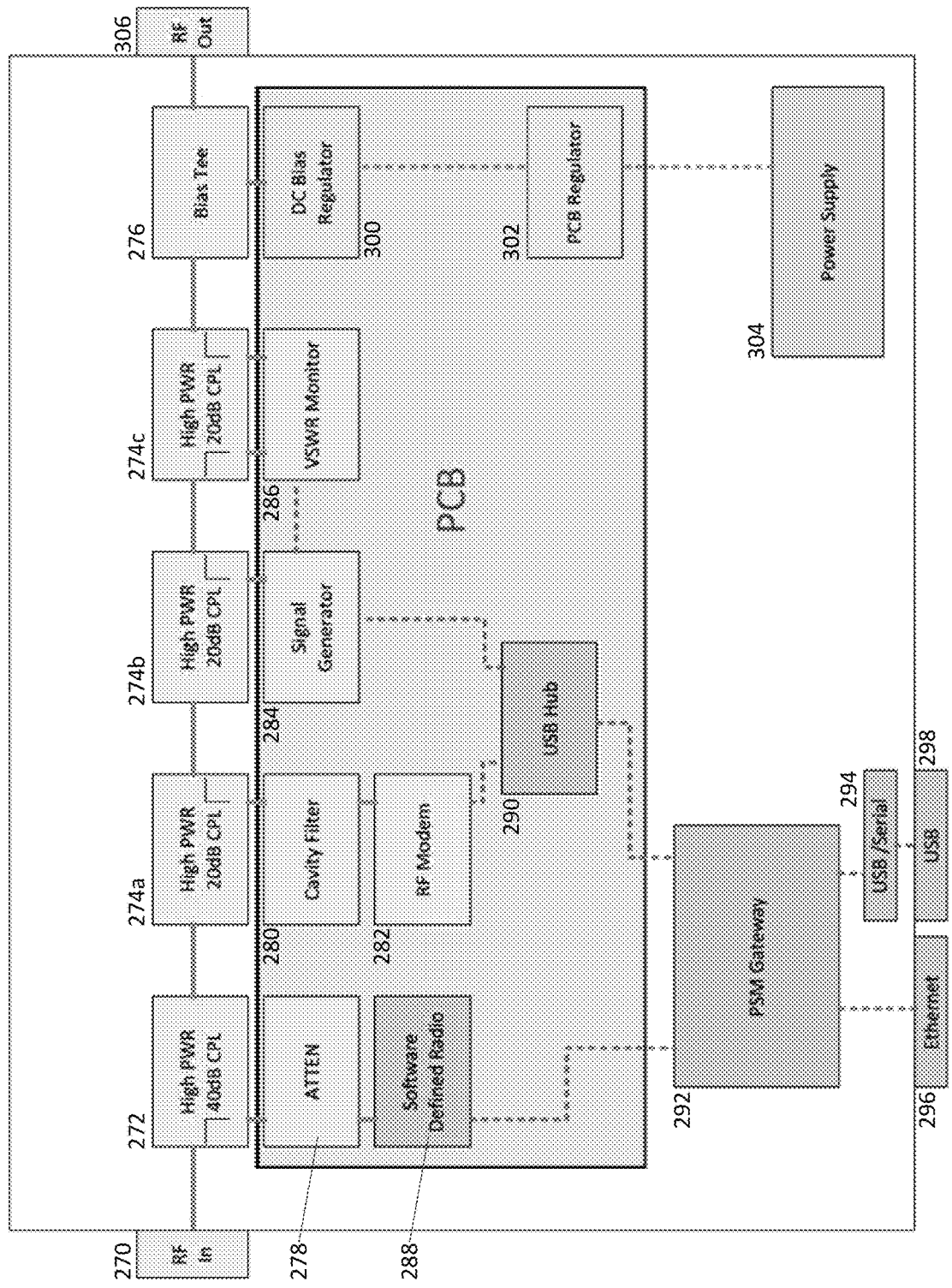
FIG. 9 is a detailed diagram illustrating hardware and software components capable of being utilized to implement the public safety monitor of FIG. 2.

FIG. 9 is a detailed diagram illustrating hardware and software components capable of being utilized to implement the PSM 14 of FIG. 2. The PSM 14 can include an RF input port 270; a high power 40 dB coupler 272; high power 20 dB couplers 274a, 274b and 274c; a bias tee 276; an attenuator 278; a cavity filter 280; an RF modem 282; a signal generator 284; a VSWR monitor 286; a software defined radio 288; a USB hub 290; a PSM gateway 292; a USB/serial port 294; an Ethernet port 296; a USB port 298; a DC bias regulator 300; a PCB regulator 302; a power supply 304; and an RF output port 306. The dotted lines denote monitor signals and control signals.

The RF input port 270 can be coupled to the high power 40 dB coupler 272. The RF input port 270 can transmit control signals to the smart node 16 and can receive a monitor signal from the smart node 16 via the RF input port 270. The PSM 14 can be energized by the power supply 304. The power supply 304 can be one of an AC or DC power supply and the PCB regulator 302 monitors the incoming voltage into the PCB of the PSM 14. The DC bias regulator 300 provides for monitoring and stabilizing the DC voltage when the power supply is a DC power supply or when the power supply is a rectified AC power supply.

The software defined radio 288 can measure forward channel power of the spectrum as it transmits through the PSM 14. The RF modem 282 is coupled to the cavity filter 280 and is a centralized communications hub for the plurality of smart nodes 16. For example, the RF modem 282 can transmit data via the DAS to each of the plurality of smart nodes 16 and can receive data from each of the plurality of smart nodes 16 via the DAS. The signal generator 284 provides a pilot tone through the DAS when the smart nodes 16 are energized by either a battery or an RF power harvester. As such, the pilot tone is not used when the smart nodes 16 are energized by either a bias tee or a USB bridge or when a pilot tone is already present in the spectrum. The VSWR monitor 286 can measure the coaxial connection on the RF output port 306 to determine whether a short circuit or open circuit is present. The bias tee 276 injects a voltage through the DAS via the RF output port 306 to energize the plurality of smart nodes 16.

The PSM gateway 292 can receive signals from the software defined radio 288 and the RF modem 282 and VSWR monitor 286 via the USB hub 290. The PSM gateway 292 can convert the signals into a readable format for the user 28. For example, during an alarm condition, the PSM gateway 292 can transmit an alarm notification via an IP network to the user 28. In addition, the PSM gateway 292 can control the enabling and disabling of all elements of the PSM 14.

The smart node 16 can be constructed and/or finished with a conversion coating. For example, the conversion coating can be, but is not limited to, a chromate conversion coating, a phosphate conversion coating, bluing, and anodizing to protect the smart node 16 from corrosion. The smart node 16 can be self-contained in an aluminum housing to help reduce signal interference or housed in a container constructed of material that can withstand wide temperature ranges, e.g., from −20° F. to +85° F.

The methods and systems herein can provide network management capabilities. As such, the smart node 16 can be managed to achieve network functions such as formation, discovery/joining, or leaving/failure. In addition, the communication channel power is low to save power and comply with FCC regulations. Embodiments of the invention can be used in various environments and/or applications. For example, although the above embodiments are described in connection with a public safety monitoring DAS, embodiments of the invention can be used in various RF coaxial networks such as commercial DAS, D-RAN wireless architectures, or RF distribution networks for GPS/GNSS signals.

Having thus described the present disclosure in detail, it is to be understood that the foregoing description is not intended to limit the spirit or scope thereof. What is desired to be protected is set forth in the following claims.

What is claimed is:

1. A system for monitoring passive components of a passive public safety distributed antenna system, comprising:

a bi-directional amplifier,
a public safety monitor coupled to and in communication with the bi-directional amplifier,
at least one smart node coupled to and in communication with the public safety monitor, and
a system timer defining a first time interval when the at least one smart node is operated in an active mode and defining a second time interval when the at least one smart node is operated in a low current mode,
wherein the at least one smart node includes a processor configured to monitor signal characteristic information of at least one passive component of the system and transmit the signal characteristic information of the at least one passive component to the public safety monitor, and the public safety monitor generates system performance information based on a signal at the bi-directional amplifier and the transmitted signal characteristic information of the at least one passive component from the at least one smart node,
and wherein the at least one smart node is operable to relay signal information monitored by a second smart node in communication with the at least one smart node to the public safety monitor.

2. The system of claim 1, wherein the at least one smart node is coupled to and in communication with one or more additional smart nodes.

3. The system of claim 1, wherein the public safety monitor transmits the generated system performance information via a modem to a user of the system.

4. The system of claim 1, wherein the at least one smart node is coupled to the public safety monitor via a coaxial cable.

5. The system of claim 1, wherein the monitored signal characteristic information of the at least one passive component of the system is a voltage standing wave ratio.

6. The system of claim 1, wherein the processor is an Internet of Things microprocessor.

7. The system of claim 1, wherein the smart node further includes a battery and the battery powers the smart node.

8. The system of claim 1, wherein the smart node further includes a bias tee and the bias tee powers the smart node.

9. The system of claim 1, wherein the smart node further includes a USB bridge and the USB bridge powers the smart node.

10. The system of claim 1, wherein the smart node further includes a radio frequency power harvesting component and the radio frequency power harvesting component powers the processor by converting radio frequency energy to direct current.

11. The system of claim 1, wherein the smart node further includes a radio frequency power harvesting component having an energy storage device, the radio frequency power harvesting component converting radio frequency energy to direct current and storing the direct current in the energy storage device to power the processor.

12. The system of claim 11, wherein the energy storage device is one of a battery and a capacitor.

13. The system of claim 11, wherein the smart node further includes a battery and the energy storage device is a capacitor such that capacitor powers the smart node and when the capacitor is discharged the battery powers the smart node.

14. The system of claim 1, wherein the at least one smart node is housed in aluminum housing or constructed with a conversion coating.

15. The system of claim 1, wherein the smart node operates within the 100 MHz to 1 GHz frequency range.

16. A method for monitoring passive components of a passive public safety distributed antenna system, comprising the steps of:
monitoring, by a processor, signal characteristic information of at least one passive component of the system and transmitting the signal characteristic information of the at least one passive component to a public safety monitor,
generating, by the public safety monitor, system performance information based on a signal at a bi-directional amplifier and the transmitted signal characteristic information of the at least one passive component, and
receiving, at the public safety monitor, signal information monitored by a first smart node and relayed to the public safety monitor by a second smart node in communication with the public safety monitor,
wherein at least one of the first smart node or the second smart node includes a system timer defining a first time interval when the smart node is operated in an active mode and defining a second time interval when the smart node is operated in a low current mode.

17. The method of claim 16, further comprising transmitting the generated system performance information via one of a modem, Ethernet, and an IP network to a user of the system.

18. The method of claim 16, further comprising generating an alert based on the generated system performance information and transmitting the generated alert via one of a modem, Ethernet, and an IP network to a user of the system.

19. The method of claim 16, further comprising harvesting radio frequency energy and converting the harvested radio frequency energy to direct current to power the processor.

20. The method of claim 16, wherein the method further comprises harvesting radio frequency energy, converting the harvested radio frequency energy to direct current, and storing the converted direct current in an energy storage device to power the processor.

21. A system for monitoring passive components, comprising:
a bi-directional amplifier,
a public safety monitor coupled to and in communication with the bi-directional amplifier, and
at least one smart node coupled to and in communication with the public safety monitor,
wherein the at least one smart node monitors signal characteristic information of at least one passive component of the system and the public safety monitor generates system performance information based on a signal at the bi-directional amplifier and the monitored signal characteristic information of the at least one passive component transmitted from the at least one smart node,
wherein the at least one smart node is operable to relay signal information monitored by a second smart node in communication with the at least one smart node to the public safety monitor, and
wherein the at least one smart node includes a system timer defining a first time interval when the at least one smart node is operated in an active mode and defining a second time interval when the at least one smart node is operated in a low current mode.

22. The system of claim 21, wherein the generated system performance information is an alert.

23. The system of claim 22, wherein the public safety monitor transmits the alert to a mobile terminal of a user of the system via a network connection.

24. The system of claim 21, wherein the at least one smart node includes a microcontroller and a radio frequency to direct current converter, the radio frequency to direct current converter converting radio frequency energy of a signal received via a coaxial cable to direct current to power the microcontroller.

* * * * *